United States Patent Office 3,019,001
Patented Jan. 30, 1962

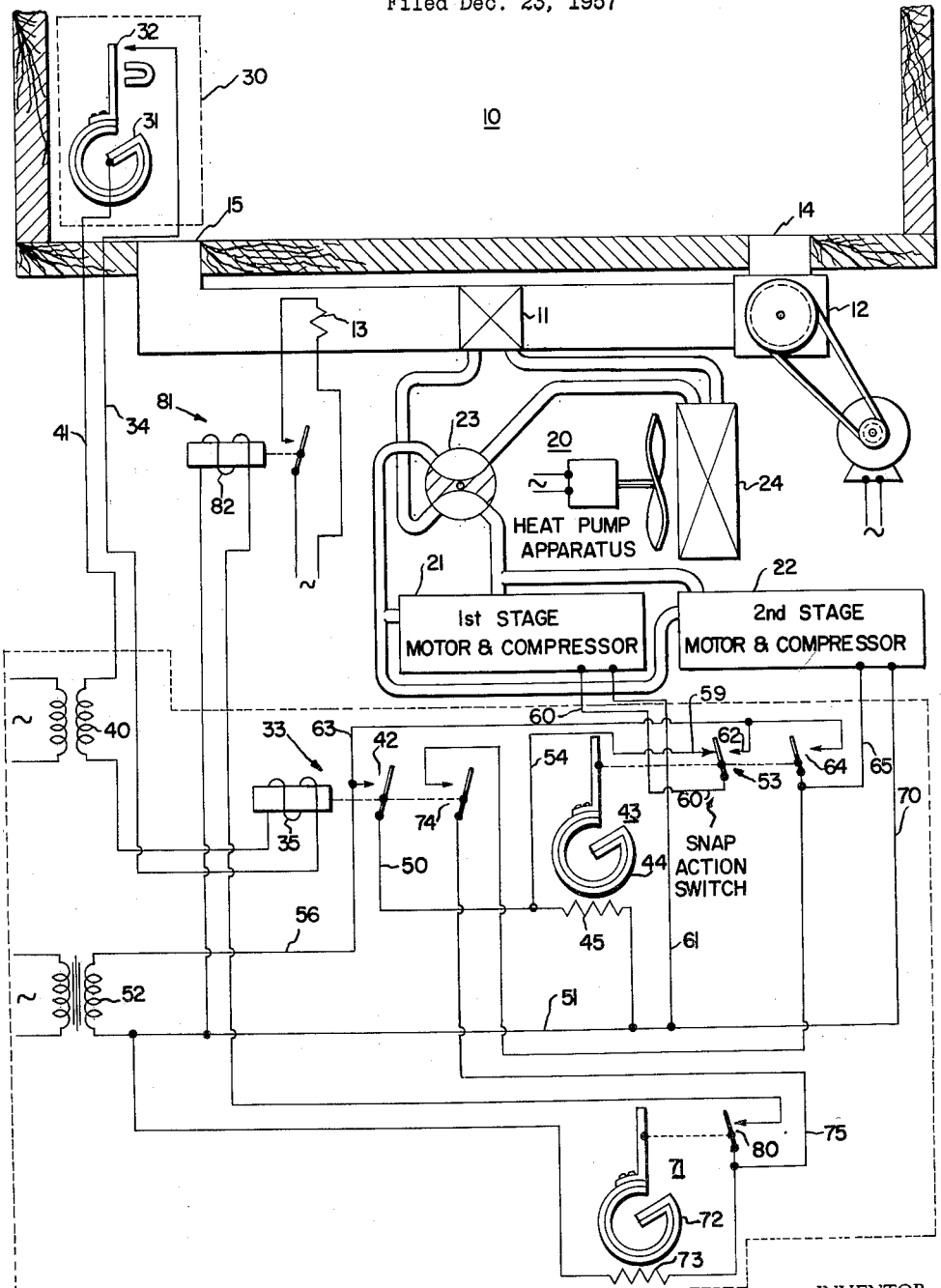

3,019,001
TEMPERATURE CONTROL APPARATUS
Edward A. Myck, Jr., Edina, Minn., assignor to Minneapolis-Honeywell Regulator Company, Minneapolis, Minn., a corporation of Delaware
Filed Dec. 23, 1957, Ser. No. 704,741
2 Claims. (Cl. 257—290)

The present invention is concerned with an improved space temperature conditioning system wherein normally high economy conditioning apparatus is used; however, during peak loads higher operating cost equipment is used. The invention provides for maximum use of the high economy equipment thus keeping the conditioning costs at a minimum.

In air conditioning apparatus where refrigeration apparatus or a heat pump is used for heating the size of the equipment is not always selected to handle the maximum or peak loads. The peak loads are satisfied by the use of a pure resistance heater. The coefficient of performance of a heat pump is normally three or four times that of resistance electric heating; therefore, it is desirable to accomplish the maximum amount of heating from the heat pump. The initial cost of heat pump equipment might be extremely high if the size of the equipment was selected to meet all peak loads. It is obvious some compromise is needed between the capacity of the heat pump equipment and the amount of pure electric heating used.

Once the size of the equiment is determined, it is desired that the heat pump be used whenever heating is needed. The present invention is concerned with the control of the heating apparatus; so that, as the load varies, a maximum use of the higher coefficient of performance equivalent is obtained. When the high coefficient of performance equipment cannot maintain the load, the low coefficient of performance equipment is placed in operation.

It is therefore an object of the present invention to provide an improved temperature control system.

Another object of the present invention is to provide a temperature control system wherein maximum use of high coefficient of performance equipment is obtained.

These and other objects of the present invention will become apparent upon a study of the specification and single drawing showing a schematic representation of a control system particularly adapted for use with a heat pump and electric heating.

Referring to the single figure, the air of a space 10 is conditioned by circulating it through a heat exchanger or coil 11 by a fan 12. A second conditioning device or heater 13 is positioned downstream of coil 11. The conditioning capacity of coil 11 and heater 13 is determined by apparatus having a high and low coefficient of performance, respectively. For explanation purposes a reverse refrigeration or heat pump system is shown connected to coil 11. Heater 13 is selectively connected to a source of power. The heat pump is of a conventional type having a two stage motor compressor unit 21 and 22. The heat pump is connected by means of a valve 23 to coil 11 and a coil 24. When valve 23 is in one position coil 11 removes heat from the air. When valve 23 is in the position shown, heat is added to the air by coil 11.

A thermostat 30 located in space 10 has a temperature responsive element 31 which opens and closes a switch 32 depending upon the temperature of the space. Thermostat 30 is connected to control relay 33 by a circuit as follows: from switch 32, a conductor 34, a relay winding 35, a secondary winding 40 of a source of power, a conductor 41, and back to switch 32. When the space temperature drops below some predetermined value relay 33 is energized. A switch 42 of the relay closes to energize an actuator or step controller 43. The step controller comprises a bimetal actuator 44 heated by a heater 45 through a circuit as follows: from switch 42, a conductor 50, heater 45, a conductor 51, a secondary 52 of a source of power, a conductor 56, and back to switch 42. Operator 44 has a plurality of switches operated thereby for controlling the first and second stages of the heat pump.

When the thermostat calls for heat, the heat pump is energized. The energization circuit is traced as follows: from secondary 52, conductor 56, switch 42, conductor 50, a conductor 54, a contact 59 of switch 53, a conductor 60, unit 21, a conductor 61, conductor 51, and back to the secondary. It is obvious that the motor compressor units would not operate from the transformer without a main power control relay which is not shown. As the thermostat maintains switch 42 closed, the temperature of bimetal 44 increases. Switch 53 would be first to actuate as the movable element moved away from contact 59 and engaged contact 62. Unit 21 is then energized through a different circuit traced as follows: from secondary 52, conductor 56, a conductor 63, contact 62, conductor 60, unit 21, conductor 61, conductor 51, and back to the secondary 52. As the space 10 continued to need heat, thermostat 30 maintains relay 33 energized and the temperature of bimetal 44 increases. A second switch 64 would close to energize the second motor compressor unit 22 through a circuit traced as follows: from switch 64, conductor 65, unit 22, a conductor 70, conductor 51, secondary 52, conductor 56, conductor 63, and back to switch 64. It is obvious the operation of step controller 43 is quite slow and the total heat of bimetal 44 depends on the percentage of closed time of the thermostat. When the heating load was higher than the capacity of heat pump 20, switch 32 is closed a sufficient amount to maintain switches 53 and 64 closed and units 21 and 22 in operation.

When switch 64 closed a second actuator or controller 71 is placed in operation. The controller 71 is shown with only one stage of heating but obviously could have others. A bimetal 72 is heated by a heater 73. The heater is energized through a circuit traced as follows: from secondary 52, conductor 56, conductor 63, switch 64, a second switch 74 closed when relay 33 is energized, conductor 75, heater 73, and back to secondary 52. As the temperature of bimetal 72 increased, a switch 80 connects a power control relay 81 to source 52. Relay 81 has its winding 82 energized through a circuit traced as follows: from secondary 52, conductor 56, conductor 63, switch 64, switch 74, switch 80, winding 82, and back to the source of power. It is obvious that the percent closed time of the thermostat regulates the temperature of bimetal 72. As the heating load becomes greater than the capacity of heat pump 20, the electric heater 13 is energized. By means of switch 74, as soon as the thermostat 30 is satisfied, heater 13 is de-energized so that the maximum capacity can be obtained from the heat pump apparatus 20.

Operation

In heat pump apparatus installation it is desired to obtain the maximum capacity from the heat pump which has a high coefficient of performance and to use regular electric heating only for those few times when the peak load is at hand. The present invention controls the heat pump to maintain a 100% operation of the heat pump as long as the heating load can be handled by this high coefficient of performance equipment. When the load increases above that capacity of the heat pump an electric strip heater is energized. In order to make the maximum use of this high coefficient of performance equipment the electric strip heater is de-energized immediately upon the thermostat reaching its control point even though the heat level of controller 71 might be sufficiently high to keep switch 80 closed.

Let us assume that the heating load increased and switch 32 closed. Relay 33 is energized to energize unit 21. As the step controller 43 moved to the right, unit 21 and unit 22 are energized through the switches 53 and 64, respectively. As soon as unit 22 was energized, controller 71 is energized to energize the stage of electric heating. Switch 74 is interposed in the circuit, and when the thermostat 30 is satisfied, it will immediately shut down the low coefficient of performance heating apparatus 13 so that a maximum use can be obtained of the heat pump.

While the present invention has been shown with a certain type of apparatus it is apparent that other modifications might be made by one skilled in the art; therefore, it is intended that the scope of the invention only be limited by the appended claims, in which

I claim:

1. In an air conditioning system, a heat pump for heating, means for obtaining supplemental heating, space temperature responsive switch means responsive to the heating needs of a space to be heated, switch actuator means, energization means to control said actuator means, a plurality of switches, means connecting said actuator means to said switches to operate said switches in sequence upon the energization of said energization means of said actuator, relay means, an energization winding for said relay means, said relay means having a first and a second switch which are closed when said energization winding of said relay means is energized, a source of power, circuit means including said temperature responsive switch means connecting said energization winding to said source of power, circuit means including said first switch for connecting said energization means of said actuator to said source of power, means including a first of said plurality of switches to connect said heat pump to said source of power, means including a second of said plurality of switches and said second switch connected in series to connect said supplemental heating means to said source of power upon a call for heat by said space responsive means whereby said heat pump and said heating means are turned on in sequence and no matter what the position of said switch actuator means upon a satisfaction of said space temperature responsive means, said heating means is de-energized when said second switch of the relay means is opened even though said actuator has not opened said second of said plurality of switches.

2. In an air conditioning system, a heat pump for normally obtaining heat, less efficient supplemental heating means, space temperature responsive switch means responsive to the heating needs of a space to be heated, switch actuator means, a plurality of switches, energization means for said actuator, means connecting said actuator to said plurality of switches to operate said switches in one sense in a slow sequence upon energization of said energization means of said actuator and upon the de-energization of said energization means of said actuator said switches are operated in a reverse sense in a slow sequence, a source of power, relay means having an energization winding and at least one switch, said one switch is closed when said energization winding is energized, means including said temperature responsive switch means connecting said winding to said source of power upon a need for heat in the space, means connecting said energization means of said actuator to said source of power so said energization means is energized when said space temperature responsive means calls for heat, electric means connecting a first of said plurality of switches to control said heat pump, electric means connecting a second of said plurality of switches and said one switch in series to control said heating means whereby upon a call for heat by said space responsive means said heat pump and said heating means are turned on and said heating means is de-energized immediately upon said space temperature responsive means being satisfied even though said switch actuator has not opened said second of said plurality of switches, said heat pump being used to a maximum degree to reduce the use of the more expensive heat from said heating means.

References Cited in the file of this patent

UNITED STATES PATENTS

| | | |
|---|---|---|
| 2,071,178 | Roessler | Feb. 16, 1937 |
| 2,241,060 | Gibson | May 6, 1941 |
| 2,776,543 | Ellenberger | Jan. 8, 1957 |
| 2,806,674 | Biehn | Sept. 17, 1957 |
| 2,902,220 | Myck et al. | Sept. 1, 1959 |